(No Model.)

W. G. RICHARDS.
CAR WHEEL.

No. 549,858.  Patented Nov. 12, 1895.

Witnesses
S. W. Potts.
Fred. J. Dole.

Inventor
William G. Richards
By his Attorney
F. H. Richards.

UNITED STATES PATENT OFFICE.

WILLIAM G. RICHARDS, OF NEW HARTFORD, CONNECTICUT.

CAR-WHEEL.

SPECIFICATION forming part of Letters Patent No. 549,858, dated November 12, 1895.

Application filed July 8, 1895. Serial No. 555,228. (No model.)

*To all whom it may concern:*

Be it known that I, WILLIAM G. RICHARDS, a citizen of the United States, residing at New Hartford, in the county of Litchfield and State of Connecticut, have invented certain new and useful Improvements in Car-Wheels, of which the following is a specification.

This invention relates to wheels particularly adapted for use as car and locomotive wheels, and especially to wheels in which the spoke and plate or web wheel are combined; and the object of the invention is to provide an integral wheel having a structure adapting it to be manufactured of steel, without having therein dangerous shrinkage-strains or other defects, such as porous or cavitied hubs, and also to produce a wheel of comparatively light weight and of relatively great strength and soundness and of a uniformity of tension throughout all the parts thereof.

Figure 3:
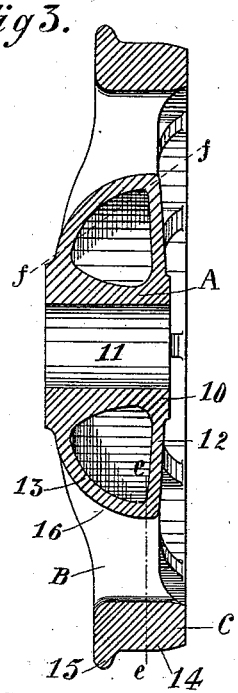
Figure 1:
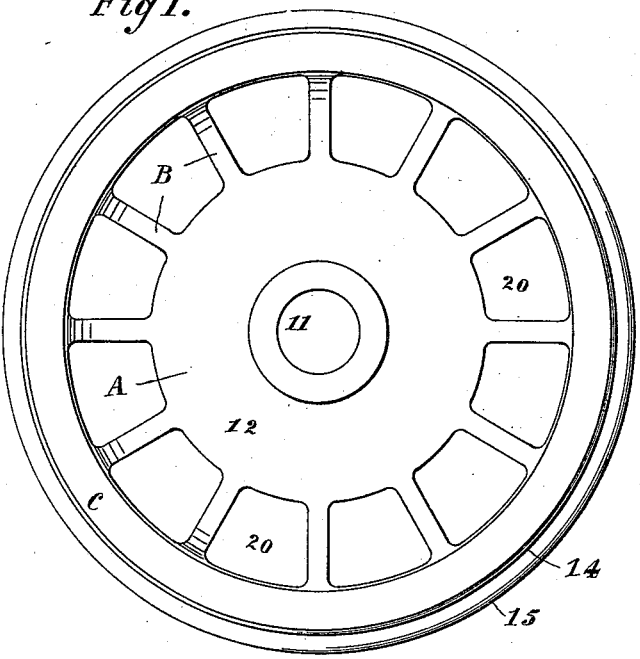
Figure 4:
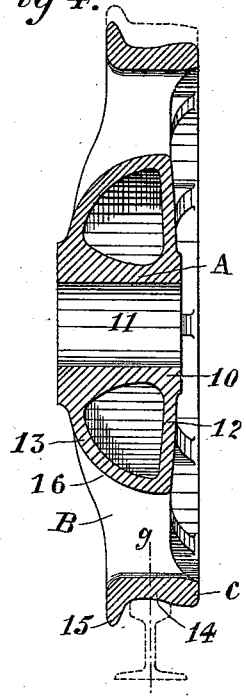
Figure 2:
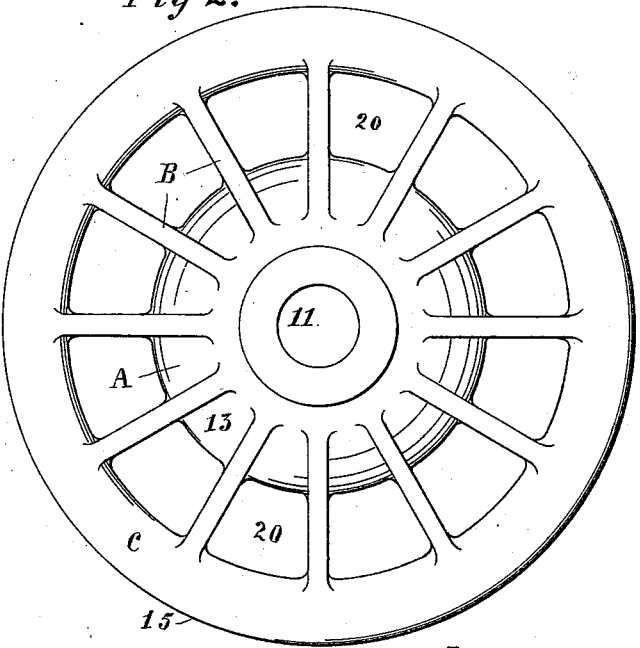

In the drawings accompanying and forming part of this specification, Figure 1 is a front view of this improved wheel. Fig. 2 is rear view of the same. Fig. 3 is a diametric sectional view of the wheel, and Fig. 4 is a view showing the manner in which the wide thin spokes tie the rim together and secure it against splitting after the rim has become worn at the tread thereof.

Similar characters represent like parts in all the figures of the drawings.

The improved wheel, hereinafter more fully described, has a central portion consisting of a hub, a relatively vertical plate joined to the hub at or near one end thereof, and a relatively inclined plate joined to the hub at a point remote from said first-mentioned plate and at its outer edge joining the outer edge of the relatively vertical plate. The spokes are set on said relatively inclined plate, whereby the juncture between the spokes and the hub portion or center of the wheel will be relatively extended, as compared with the depth of the spokes. Each of the spokes is separated from the others, so as to have, when the wheel is cast in steel, a longitudinal shrinkage independent of the other spokes and so as to have, when subjected to severe work, a flexure independent of the other spokes. The rim of the wheel is carried on the spokes, and all parts of the wheel will generally in practice be formed in one integral casting.

The invention is shown consisting of a car or locomotive wheel in which the rim and the hub thereof are united by means of a disk-shaped plate or web and a curved or arch-shaped plate or web joined to the outer edge of said disk-shaped plate, and both of said plates joined to the hub substantially adjacent to the opposite ends of said hub, together with a series of radial relatively wide and thin spokes having clear spaces between them and disposed with their greater width transversely or crosswise of the rim and plates, whereby they will receive the greatest strain edgewise thereof, said spokes being joined to the arch-shaped plate or web by a juncture extending beyond the width of the widest portion of the spokes, whereby a wheel is constructed in which the defects usually appertaining to either single or double plate wheels or to spoke-wheels as heretofore constructed are eliminated or overcome—that is to say, in car-wheels commonly known as "plate-wheels" it has been found that the plates are liable to crack in the plate portion thereof in consequence of the expansion of the metal by the severe application of the brakes and the consequent friction and heat, so that it has been the usual method to reinforce such wheels by ribs upon the plate portions thereof, which extend to the rim of the wheel to prevent splitting. These reinforcing-ribs, however, necessitate objectionable fillets or corners in the casting, which cause unequal cooling of the metal, and thereby leave in the casting internal strains dangerous to the structure.

In the case of car-wheels commonly known as "spoke-wheels," in order to remedy the weak points in the hubs, and thereby prevent the bursting thereof when pressed upon the axles, it has heretofore been found necessary to increase the thickness of the metal in the hub. This not only increases the expense, but it is also dangerous to the wheel, as the heavy mass of metal at the hub is liable to be porous and at times have internal cavities therein. In practice, therefore, in order to produce a steel wheel of superior quality a structure must be obtained having a comparatively large number of comparatively thin spokes set with the greatest width crosswise or transversely of the rim and without the use of a solid or thick hub joining these spokes, which hub would, as before stated, cause large shrinkage-strains in the castings and induce the formation of internal cavities, which would be extremely detrimental to the wheel, as it is well known that internal cavities in steel wheels are very dangerous, tending to promote the rupture of the wheel. In order, therefore, to obtain such a structure and to obviate the dangerous and constantly-occurring defects in car-wheels as heretofore constructed, I have provided the improved wheel hereinafter described, which by its peculiar structure not only provides a wheel of great strength and durability, but of comparatively light weight, and which also by its structure overcomes the weakness due to the shrinkage-strains at the juncture of the spokes with the plates or webs.

This improved wheel consists, in the preferred form thereof herein shown and described, of the body portion, (designated in a general way by A,) comprising the hub and the extending plates or webs of the radial spokes (designated in a general way by B) and the rim, (designated in a general way by C,) all preferably integrally united and cast in one piece of any suitable material, but preferably of steel.

The body portion A of the wheel consists of the central tubular member or hub 10, having the usual axle-seat 11. On the front part of the hub, adjacent to the end thereof, is a substantially disk-shaped plate or web 12, preferably slightly curved in a rearward direction relative to the hub, and when so curved the edge thereof will be in a plane adjacent or about midway the tread and also of the weight, as shown by dotted line $e\ e$. On said hub, opposite the said plate or web 12 and substantially adjacent to the end of said hub, is a curved or arch-shaped back plate or web 13, which back plate or arch-shaped plate or web 13 is joined to the outer edge of the disk or front plate or web 12. Said plate 13 extends obliquely from the plane of the front edge of the spokes to or beyond the plane of the rear edge thereof, such oblique extension being herein shown in the preferred form by dotted line $f\ f$, Fig. 3.

The arch-shaped plate 13 by means of its particular disposition near the rear end of the hub reinforces said hub and makes it secure against bursting when pressed onto the axle and also permits the construction of a light hub, as only a small amount of metal is required between the plates 12 and 13.

The rim C has the usual tread 14 and the flange 15 and is united with the body portion A by the radial spokes B, having clear spaces 20 between them. These spokes are relatively thin in cross-section and of relatively large width transversely of the rim and are disposed transversely or crosswise of said rim and plates, whereby they will receive the greatest strain edgewise thereof, and whereby the rim is secured against splitting when it has become partially worn, as shown in Fig. 4, in which the dotted line indicates the point where the rim, after it has become worn, would most likely split, but is prevented from so splitting by means of the large-width spokes tying the rim together. Said spokes are joined to the body portion A at the curvature of the arch-shaped plate 13 by extended or increased substantially curved junctures 16, whereby the length of the joints is increased substantially beyond the width of the widest portion of the spokes and obliquely of the spokes, thus bringing the strength of the structure of the spokes up to the maximum strength of the cross-section of said spokes, and thereby eliminating or overcoming the weakness which would otherwise exist in the structure owing to the shrinkage-strains at such juncture of the spokes and the arch-shaped plate.

In this superior construction of wheel the arch-shaped plate 13 furnishes a means whereby during the contraction of the casting the internal strains of the wheel-structure may be reduced within a safe limit through the natural deflection or modification of curvature of said plate during the cooling of the casting without detriment to the wheel, and by this improved construction a wheel is produced of very great strength and uniformity of tension throughout all the parts thereof and the use of thick bodies of metal within the rim or adjacent to the hub obviated, and thus a lighter wheel produced of practically the same strength as a wheel constructed by the use of a mass of metal inside the rim, as heretofore. Moreover, as a result of this peculiar structure of wheel the radial spokes and plates, being thinner than the rim thereof, cool quicker than said rim, so that when the rim reaches the closing period of its shrinkage it draws inward upon all the wheel-spokes, and through these against the arch-shaped plate 13, thereby strongly tending to hold the structure of the wheel into one rigidly-compressed condition. Furthermore, by the construction of a wheel as above described the lateral stress of the flange of the rim is in a direction against the arch-shaped plate of the hub—that is, when the flange of the rim is under lateral stress it tends to carry the lower ends of the spokes backward, but the juncture ends forward, thereby compressing the arch-shaped plate 13, while merely deflecting the plate 12, which, as before stated, has preferably only a slight curvature, so that said plate 12 during this moment will operate with full effect to support the relatively short spokes, and through these spokes support the tread against the load carried by the wheel.

It will thus be seen from the foregoing that a peculiar mechanical action exists between the several portions of the wheel, which action operates in a manner in peculiar harmony with the requirements for making such a wheel of steel, which by reason of its peculiar physical qualities and properties has not heretofore been applied with entire success to the making of wheels of the general class described.

Having thus described my invention, I claim—

1. The improved wheel herein described, consisting of a hub; a front plate joining the front end of the hub; an arched back-plate joining the back end of the hub and the outer edge of the front plate; a rim; and a series of spokes joining the rim and the arched back-plate, and having clear spaces between said spokes, and having the spokes joined with the back-plate by a juncture extending in a direction obliquely from the front to the back edge of the spokes, substantially as described, and for the purpose set forth.

2. The improved wheel herein described, consisting of a hub; a disk-shaped plate; an arch-shaped plate joined to said disk-shaped plate at its outer edge, and both of said plates joined to the hub substantially adjacent the opposite ends thereof; a rim; and a series of spokes joining the rim and the arch-shaped plate, and having clear spaces between said spokes, and having the spokes joined with the arch-shaped plate by a substantially-curved juncture extending in a direction obliquely of the spokes, from the front to the rear edge thereof, substantially as described, and for the purpose set forth.

3. The improved wheel herein described; a disk-shaped plate; an arch-shaped plate joined to said disk-shaped plate at its outer edge, and both of said plates joined to the hub substantially adjacent to the opposite ends thereof; a rim; and a series of relatively wide, thin spokes having clear spaces between them, and joined to the rim with their greater width transversely thereof, whereby the rim is secured against splitting, and whereby the spokes are set edgewise of the greatest strain; said spokes joining the arch-shaped plate by a juncture extending beyond the width of the widest portion of the spoke, substantially as described, and for the purpose set forth.

4. The improved wheel herein described, consisting of a hub; a disk-shaped plate slightly curved in a rearward direction; an arch-shaped plate joined to said disk-shaped plate at its outer edge, and both of said plates joined to the hub substantially adjacent to the opposite ends thereof; and a series of relatively wide, thin spokes having clear spaces between them, and joined to the rim with their greatest width transversely thereof, whereby the rim is secured against splitting, and whereby the spokes receive the greatest strain edgewise thereof; said spokes joining the arch-shaped plate by a substantially-curved juncture extending in a direction obliquely from the front edge to the rear edge of the spokes, and beyond the width of the widest portion of said spokes, substantially as described, and for the purpose set forth.

5. The improved wheel consisting of a hub; a plate joined to the hub and relatively vertical thereto; a second plate joined to the hub at a point remote from the first-mentioned plate and set relatively inclined to the hub and to the first-mentioned plate, and said plates joined together at their outer edges, thereby forming a chamber between said plates and about the hub, and supporting the outer edge of the inclined plate by means of the relatively-vertical plate; and a series of spokes set on the inclined plate, and each separated from the others, whereby the juncture of the spoke with said inclined plate is extended; and a rim carried on the spokes, substantially as described.

6. The improved wheel consisting of a hub; a plate joined to the hub and relatively vertical thereto; a second plate joined to the hub at a point remote from the first-mentioned plate, and set relatively inclined to the hub and to the first-mentioned plate, and said plates joined together at their outer edges, thereby forming a chamber between said plates and about the hub, and supporting the outer edge of the inclined plate by means of the relatively-vertical plate; a rim; and a series of relatively-wide, thin spokes, each separated from the others, and joined, respectively, with the inclined plate and with the rim and transversely thereto, and having the juncture of the spokes with said inclined plate and with the rim extended relatively to the adjacent portions of the spokes, substantially as specified.

WILLIAM G. RICHARDS.

Witnesses:
FRANCIS H. RICHARDS,
HUBERT P. RICHARDS.